(12) United States Patent
Fuller et al.

(10) Patent No.: US 7,220,510 B2
(45) Date of Patent: May 22, 2007

(54) SULFONATED POLY(ARYLENE) FILMS AS POLYELECTROLYTE MEMBRANES

(75) Inventors: Timothy J Fuller, Pittsford, NY (US); Beba Dobulis, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 131 days.

(21) Appl. No.: 10/956,653

(22) Filed: Oct. 1, 2004

(65) Prior Publication Data

US 2006/0073369 A1 Apr. 6, 2006

(51) Int. Cl.
- *H01M 8/10* (2006.01)
- *H01M 6/18* (2006.01)
- *C08J 5/20* (2006.01)
- *C08F 273/00* (2006.01)
- *C08F 265/00* (2006.01)

(52) U.S. Cl. .................... 429/33; 429/46; 429/309; 429/314; 429/316; 429/317; 521/27; 525/242; 525/288; 525/291; 525/293

(58) Field of Classification Search ............... 429/33, 429/46, 309, 314, 316, 317; 521/27; 525/242, 525/288, 291, 293
See application file for complete search history.

(56) References Cited

U.S. PATENT DOCUMENTS 6,340,716 B1 * 1/2002 Armand et al. ............. 522/31
6,515,101 B1 2/2003 Sheares
6,555,626 B2 * 4/2003 Goto et al. .................. 525/242
6,933,068 B2 * 8/2005 Asano et al. ................. 429/33

* cited by examiner

*Primary Examiner*—Patrick Joseph Ryan
*Assistant Examiner*—Angela J. Martin
(74) *Attorney, Agent, or Firm*—Harness, Dickey & Pierce, P.L.C.

(57) ABSTRACT

Polyelectrolyte membranes suitable for use in a fuel cell are provided as a solid state sulfonation product of particular fluorinated polymers, or alternatively as a fluorination product of particular sulfonated polymers. A sulfonated polymer is provided that contains repeating units represented by structure,

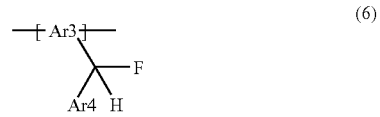

(6)

wherein the groups Ar3 and Ar4 are independently selected from the group consisting of aryl rings, aryl ring systems, and thiophene rings, and where at least one of Ar3 and Ar4 is substituted with a sulfonate group. Films suitable for use as a polyelectrolyte membrane are prepared from the sulfonated polymers.

23 Claims, 1 Drawing Sheet

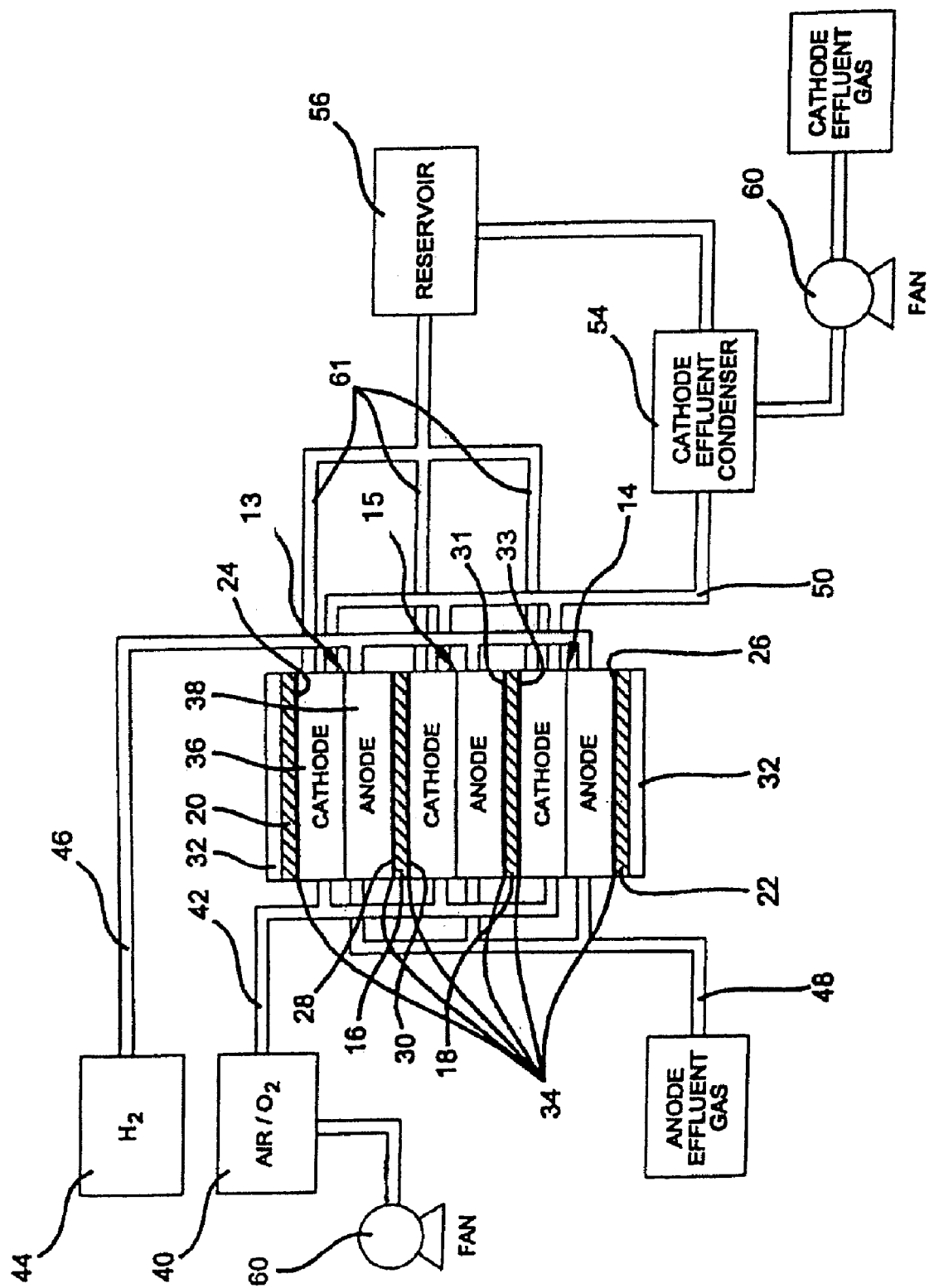

US 7,220,510 B2

SULFONATED POLY(ARYLENE) FILMS AS POLYELECTROLYTE MEMBRANES

The invention relates to polyelectrolyte membranes and their use as proton exchange membranes in fuel cells. More particularly, the invention relates to treatment of certain poly(arylene) films to provide a polyelectrolyte for fuel cell applications.

Fuel cells are increasingly being used as power sources for electric vehicles and other applications. An exemplary fuel cell has a membrane electrode assembly with catalytic electrodes and a membrane formed between the electrodes. Hydrogen fuel is supplied to the anode side of the assembly, while oxygen is supplied to the cathode. The membrane provides an electrical connection between the anode and cathode, and provides a medium through which fuel oxidation products are transported from the anode to combine with the reduced oxygen at the cathode. The overall reaction in the fuel cell is the combination of hydrogen and oxygen to yield water and an electromotive potential. Because the oxidation product of the fuel is essentially $H^+$ or a proton, the polyelectrolyte membrane is also known as a proton conducting membrane or a proton exchange membrane (PEM).

Water management is important in a PEM fuel cell. A proton must be hydrated to pass through the proton exchange membrane to combine with oxygen at the cathode. According to various models, 7 to 11 water molecules are needed to account for the transport of one proton through the membrane. It has been observed that when relative humidity in the fuel cell is low, proton transport is less efficient and the current available from the cell is reduced. To avoid this, it is possible to humidify fuel cells to prevent the membranes from drying out. However, as temperature of fuel cell operation increases, pressurization may be necessary which leads to added expense.

PEM fuel cells operate at temperatures up to about 95° C. with external humidification at elevated pressures being required to maintain proton conductivity. As the membranes dry out at reduced humidity, proton conductivity deteriorates rapidly.

The industry is constantly looking for new membrane material that conduct proton efficiently at reduced humidity levels. It would further be desirable to provide membranes for PEM fuel cells with improved cost and durability characteristics.

SUMMARY

Polyelectrolyte membranes suitable for use in a fuel cell are provided as a solid state sulfonation product of particular fluorinated polymers, or alternatively as a fluorination product of particular sulfonated polymers. For example, the fluorinated polymer that is sulfonated to provide the polyelectrolyte membranes contains repeating units of monomers represented by

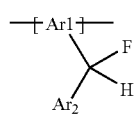
(1)

The groups Ar1 and Ar2 are independently selected from the group consisting of aryl rings, aryl ring systems, and thiophene rings. The groups Ar1 and Ar2 can be substituted with $C_1$ to $C_4$ alkyl groups or with other substituents that do not interfere with use of the sulfonation products as polyelectrolyte membranes.

The fluorinated polymers containing repeating units given above are prepared in various embodiments from polymers having the corresponding structure,

(2)

wherein Ar1 and Ar2 as described above. In a first step, the carbonyl of the side chain is reduced to an alcohol. Following reduction, the alcohol is fluorinated with suitable fluorination reagents. A solid state film made from the fluorinated polymer is then sulfonated by exposing the film to known sulfonating agents.

BRIEF DESCRIPTION OF THE DRAWINGS

The present invention will become more fully understood from the detailed description and the accompanying drawings, wherein:

FIG. 1 is a schematic illustration of three cells in a stack in an exemplary fuel cell system.

DETAILED DESCRIPTION OF THE PREFERRED EMBODIMENTS

The following description of the preferred embodiment(s) is merely exemplary in nature and is in no way intended to limit the invention, its application, or uses.

In one embodiment, a polyelectrolyte membrane suitable for use in a fuel cell is provided. The membrane comprises a solid state sulfonation product of a fluorinated polymer. The fluorinated polymer is preferably in film form when the sulfonation reaction is carried out. The fluorinated polymer contains repeating units represented by the structure,

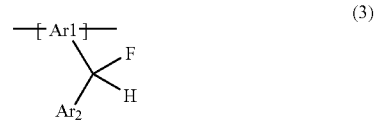
(3)

wherein Ar1 and Ar2 are independently selected form the group consisting of aryl rings, aryl ring systems, and thiophene rings. The groups Ar1 and Ar2 are optionally substituted with $C_1$ to $C_4$ alkyl groups and/or halogen. In various embodiments, Ar1 and Ar2 are independently selected from the group consisting of phenyl rings and thiophene rings. In various embodiments, the membranes are made by a process comprising contacting a film of the fluorinated polymer with the sulfonating agent. In another embodiment, a method is provided for making polyelectrolyte membranes and films as described above. The method comprises reacting an arylene polymer with a reducing agent to produce a reduced polymer. The reduced polymer contains repeating units of structure,

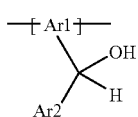

(4)

wherein Ar1 and Ar2 are described above. A film is then solution cast from a solution of the reduced polymer. The film is then reacted with a fluorinating agent to produce a fluorinated film. Finally, the fluorinated film is contacted with a sulfonating agent to prepare the polyelectrolyte film.

In various embodiments, the polyelectrolyte film of the invention is made by carrying out a series of reduction, fluorination, and sulfonation steps on a poly(arylene) polymer containing substituted aryloyl- (benzoyl- or arylketo-) groups as pendant groups on a main chain containing arylene repeating units. As used here, the aryloyl groups have a structure represented by,

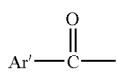

(5)

wherein Ar' corresponds generally to the group Ar2 given in the structures above.

In further embodiments, a sulfonated polymer is provided that contains repeating units represented by structure,

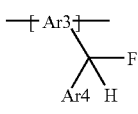

(6)

wherein the groups Ar3 and Ar4 are independently selected from the group consisting of aryl rings, aryl ring systems, and thiophene rings, and where at least one of Ar3 and Ar4 is substituted with a sulfonate group. Films suitable for use as a polyelectrolyte membrane are prepared from the sulfonated polymers.

In another embodiment, fuel cells are provided that contain the polyelectrolyte membranes described above. In one embodiment, a fuel cell comprises an anode, a cathode, and a polyelectrolyte membrane disposed between the anode and the cathode to form a membrane electrode assembly (MEA). The fuel cells further comprise an inlet for hydrogen fuel adjacent the anode and an inlet for oxygen adjacent the cathode. The fuel cell is operated by providing hydrogen fuel to the anode side and oxygen to the cathode side.

In various embodiments, arylene polymers are reduced to form reduced polymers. The reduced polymers are then fluorinated to form fluorinated polymers. Finally, the fluorinated polymers are sulfonated to provide sulfonated polymers of the invention useful as polyelectrolyte membranes. The various polymers and the reaction conditions involved in the transformations involved in synthesizing the polyelectrolyte membranes of the invention will now be described.

The arylene polymers of the invention contain aryl groups or thiophene rings in the main chain of a polymer. They are prepared by homo- or copolymerization of aryl (or thiophene) di-halides catalyzed by nickel or other suitable catalyst compositions, as described further below. At least some of the aryl groups or thiophene rings in the main chain are substituted with an arylacyl group, providing a pendant side chain.

In addition to the aryl groups, the arylene polymers may contain aryl ring systems in the main chain. As used here, aryl group refers to a phenyl, naphthyl or other single or multiring fused structure, while an aryl ring system refers to systems that contain a plurality of aryl groups attached, to one another by bonds that do not form part of an aryl ring. Examples of aryl ring systems include diphenyl, as illustrated further below.

In one aspect, the arylene polymers contain arylene repeating units, including those represented by structure

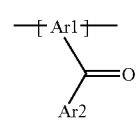

(7)

wherein Ar1 and Ar2 are independently selected from the group consisting of aryl rings, aryl ring systems, and thiophene rings, and are optionally substituted with $C_1$ to $C_4$ alkyl groups or other substituent that do not interfere with the function of the polyelectrolyte membranes made from them. In this aspect, at least a portion of the arylene repeating units contain an arylacyl group —C(O)—Ar', wherein Ar' is an aryl group such as phenyl.

The arylene polymers can contain repeating units derived from other arylene groups. Non-limiting examples of arylene groups and arylene ring systems include:

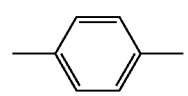

(8)

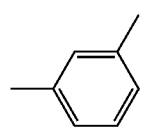

(9)

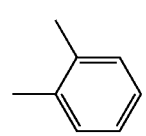

(10)

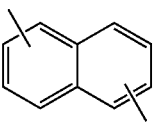

(11)

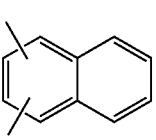

(12)

-continued

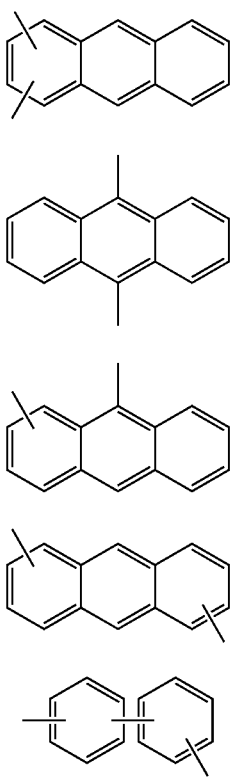

(13)

(14)

(15)

(16)

(17)

Further non-limiting examples of arylene monomers include the fluorinated monomers such as described in U.S. Pat. No. 6,515,101 to Sheares, the disclosure of which is herein incorporated by reference.

Suitable arylene polymers include poly(3-benzacyl-2,5-thiophene) and substituted derivatives thereof, as well as poly(2,5-benzophenone) and its derivatives. The former may be synthesized by nickel catalyzed polymerization of a monomer of structure,

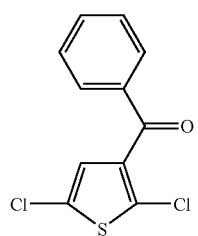

(18)

shown here in its unsubstituted form. Various substitutions are also possible on the phenyl ring or the thiophene ring. Alternatively, arylene polymers can be synthesized by polymerizing the dichlorothiophene monomers with other arylene monomers that do not contain the arylacyl group.

Poly(2,5-benzophenones) can be synthesized by polymerizing monomers having in the structure

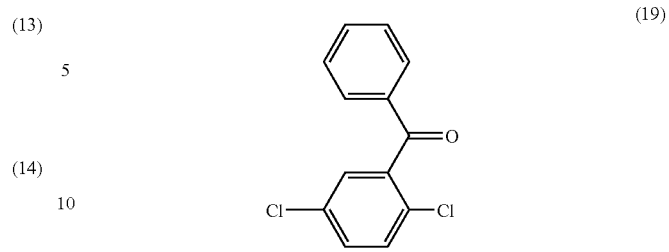

(19)

The phenyl rings in the structure above may alternatively be substituted with $C_1$ to $C_4$ alkyl groups, aryl groups, or other groups that do not interfere with operation of the polyelectrolyte membrane. Suitable polymers and conditions for their polymerization are given, for example in Wang et al., *Polymer Preprints,* 1997, Vol. 38, pgs 263–264, and in Pasquale et al., *Polymer Preprints,* 1997, Vol. 38, pgs 170–171, the disclosures of which are herein incorporated by reference.

The arylene polymers described above can be synthesized by heating combinations of the respective monomers with a suitable catalyst system. Catalysts system for synthesizing the arylene polymers are well known, and are described for example in U.S. Pat. No. 6,555,626, the disclosure of which is herein incorporated by reference. The catalyst systems preferably contain either a combination of a transition metal salt and one or more ligands, or a transition metal having one or more ligands coordinated onto the transition metal. The systems further contain a reducing agent. A salt may be added to the catalyst system to increase the rate of polymerization.

Examples of the transition metal salt include nickel compounds such as nickel chloride, nickel bromide, nickel iodide, and nickel acetylacetonates. Palladium compounds, iron compounds, and cobalt compounds can also be used. Examples of ligands include triphenylphosphine, 2,2'-bipyridine, 1,5-cyclooctadiene, and the like. Examples of reducing agents include iron, zinc, manganese, aluminum, magnesium, sodium, and calcium. In various embodiments, zinc, magnesium, and manganese are preferred.

As noted above, the arylene polymers contain arylacyl groups pendant from a poly(arylene) main chain. In the next step of the method for producing the polyelectrolyte membranes of the invention, the arylene polymer is reduced to convert the keto group of the pendant arylacyl group to a secondary alcohol. Reduction to the alcohol is preferably carried out in solution. A number of suitable reducing agents are well known in the art. A non-limiting example is borane ($BH_3$) in tetrahydrofuran. In various embodiments, the specific reducing agent to be used is not particularly critical, but it should be chosen for favorable characteristics, such as high yield, relatively low temperatures, or relative lack of impurities that would interfere with subsequent reactions. A reduced polymer is thus prepared by the action of a reducing agent on the arylene polymers described above.

In a subsequent step, the reduced polymer is fluorinated to provide a fluorinated polymer. The fluorination reaction occurs by reaction of a fluorinating agent on the reduced polymer to reduce a polymer having repeating units of structure

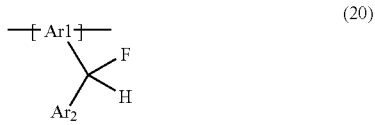

(20)

Suitable fluorinating agents can be selected from among those known in the art. A preferred fluorinating agent is diethylaminosulfur trifluoride (DAST). Other fluorinating agents include, without limitation, bis(2-methoxyethyl)aminosulfur trifluoride, sulfur tetrafluoride, selenium tetrafluoride, cobalt trifluoride, and phenylsulfur trifluoride.

In a preferred embodiment, fluorination of the reduced polymer is carried out on a solution cast film of the reduced polymer. The reduced polymer is solution cast according to known procedures. The fluorination step is carried out by contacting the cast film with a solution of the fluorinating agent.

In a subsequent step, the fluorinated polymer, preferably in the form of a film as discussed above, is sulfonated to provided a polyelectrolyte membrane. The sulfonation step introduces sulfonic acid groups onto the fluorinated polymer. The precise location of the sulfonic acid groups on the polymer is not precisely known, but it is expected that sulfonic acid groups will be attached to aryl and thiophene rings of the polymers. The sulfonic acid group can be incorporated by sulfonating the fluorinated polymer films with known sulfonating agents such as sulfuric acid anhydride, fuming sulfuric acid, chlorosulfonic acid, sulfuric acid, and sodium hydrogen sulfite under known conditions. In various embodiments, the sulfonation is carried out by contacting the fluorinated polymer, preferably in the form of a film, with a solution of the sulfonating agent. The time and temperature of the contact can be varied to incorporate more or fewer sulfonic acid groups as desired.

The method described above can be illustrated by the following, where Ar1 and Ar2 are represented as phenyl groups:

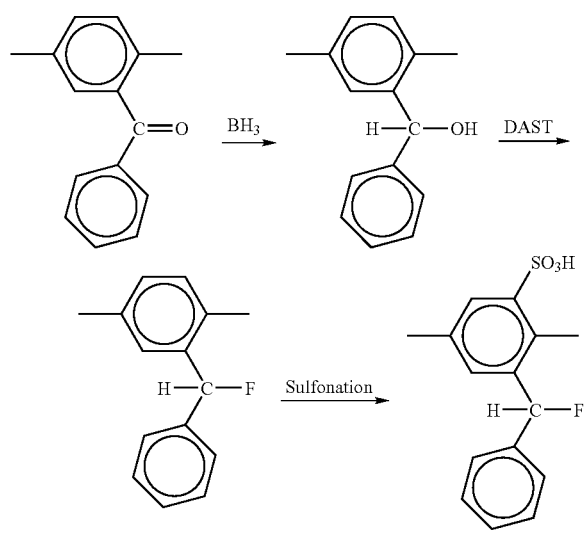

Alternatively, the arylketone polymers can first be sulfonated, then reduced and fluorinated as described above, followed by a hydrolysis step to prepare the sulfonated films. Such an alternative scheme is illustrated below for the case where Ar1 and Ar2 are phenyl:

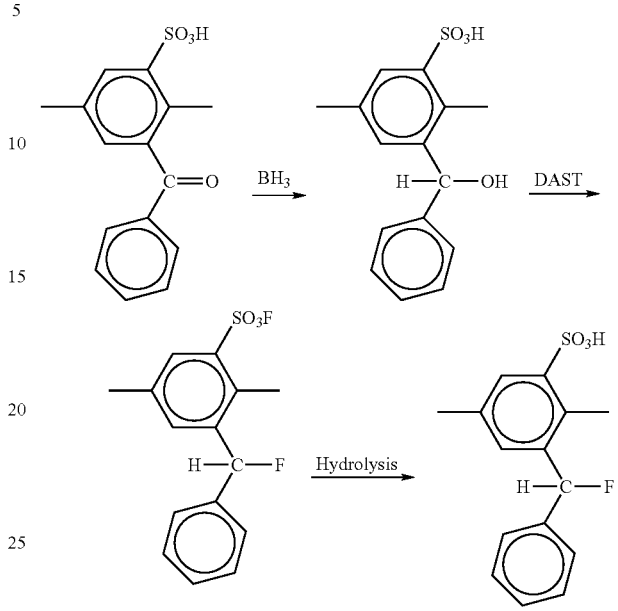

The incorporation of sulfonic acid groups can be determined by measuring the ion exchange capacity (IEC) of the membrane by known methods. For example, the membrane is suspended in water and titrated to a pH of 7 with sodium hydroxide. The IEC of the membranes is conveniently expressed in meq $SO_3H$/g of polymer, where meq stands for milliequivalents. For use as polyelectrolyte membranes, enough sulfonic acid groups should be incorporated to provide sufficient proton conductivity. On the other hand, high levels of sulfonic acid group incorporation should be avoided because it tends to solubilize the sulfonated films in water. The amount of sulfonic acid groups contained in the polymer is generally from 0.5 to about 5 meq per gram, preferably from about 1 to about 4 meq per gram of the polymer. In a preferred embodiment, the IEC is 3.2 meq/g or less and greater than about 0.5 meq/g.

After the film is immersed in the chlorosulfonic solution, it is exposed to water to hydrolyze chlorosulfonic groups to sulfonic acid groups. In one embodiment, the film is exposed to boiling water for a suitable time, for example about an hour.

Fuel cells are provided according to the invention by using a polyelectrolyte film made by the above method as the proton exchange membrane of a membrane electrode assembly (MEA). In preferred embodiments, the sulfonate content of the proton exchange membrane is 1.7 meq/g or greater, and the liquid water conductivity at 100° C. is greater than 0.2 S/cm. In other preferred embodiments, the sulfonate content is 1.9 meq/g or higher.

Referring generally to FIG. 1, three individual proton exchange membrane (PEM) fuel cells according to one preferred embodiment of the present invention are connected to form a stack. Each PEM fuel cell has membrane-electrode-assemblies (MEA) 13,15,14, respectively, separated from one another by electrically conductive, impermeable separator plates 16,18, and further sandwiched between terminal separator plates 20,22 at each end of the stack with each terminal plate 20,22 having only one electrically active side 24,26. An individual fuel cell, which is not connected in series within a stack, has a separator plate, with only a single electrically active side. In a multiple fuel cell stack, such as the one shown, a preferred bipolar separator plate 16 typically has two electrically active sides 28,30 respectively facing a separate MEA 13,15 with opposite charges that are separated, hence the so-called "bipolar" plate. As described herein, the fuel cell stack has conductive bipolar separator plates in a stack with multiple fuel cells, however the present invention is equally applicable to conductive separator plates within a stack having only a single fuel cell.

The MEAs 13,15,14 and bipolar plates 16,18 are stacked together between aluminum clamping plates 32 at each end of the stack and the end contact terminal plate elements 20,22. The end contact terminal plate elements 20,22, as well as working faces 28,30 and 31,33 of both bipolar separator plates 16,18, contain a plurality of gas flow channels (not shown) for distributing fuel and oxidant gases (i.e., $H_2$ & $O_2$) to the MEAs 13,15,14. Nonconductive gaskets or seals (not shown) provide seals and electrical insulation between the several components of the fuel cell stack. Gas-permeable conductive diffusion media 34 press up against the electrode faces of the MEAs 13,15,14. When the fuel cell stack is assembled, the conductive gas diffusion layers 34 assist in even distribution of gas across the electrodes of the MEAs 13,15,14 and also assist in conducting electrical current throughout the stack.

An inlet for oxygen adjacent the cathode and an inlet for hydrogen adjacent the anode are also provided. Oxygen is supplied to the cathode side 36 of each fuel cell in the stack from storage tank 40 via appropriate supply plumbing 42 to provide an inlet for oxygen adjacent the cathode, while hydrogen is supplied to the anode side 38 of the fuel cell from storage tank 44, via appropriate supply plumbing 46 to provide an inlet for hydrogen adjacent the anode. Alternatively, air may be supplied to the cathode side 36 from the ambient, and hydrogen to the anode 38 from a methanol or gasoline reformer, or the like. Exhaust plumbing for the anode side 48 and the cathode side 50 of the MEAs 13,15,14 are provided. On the cathode side, the plumbing defines an exit side. Gas flow into and out of the stack is typically facilitated by fans 60, such as those shown in the exemplary configuration of FIG. 1. Any means of transporting fluids into and out of the stack are feasible, and the configuration and number of fans shown is merely exemplary and not limiting.

As shown in FIG. 1, the cathode effluent 50 is routed from the stack to a condenser 54, which serves to liquefy and recover the vapors in the cathode effluent stream 50. The liquids (e.g. water) are transported to a reservoir 56 for storage. The effluent stream 50 from the cathode has a high concentration of vapor (water vapor, for example) due to the water generated by the electrochemical reactions occurring within the MEA and any additional water introduced for cooling. The water evaporates due to pressure and temperature conditions within the fuel cell. Preferably, the effluent stream is saturated with vapor (e.g. in the case of water at approximately 100% relative humidity). As shown, the supply conduits 61 provide water to the cathode side of each MEA 13,15,14 by interconnecting the reservoir 56 to the fuel cells in the stack. A pump (not shown) may optionally be included in the system to facilitate the transport of the liquid from the reservoir 56 to the stack, or through other areas of the system.

The invention has been described above with respect to various preferred embodiments. Further non-limiting examples are given in the examples that follow.

EXAMPLES

Example 1

Poly(2,5-benzophenone) is dissolved in methylene chloride (1 gm of polymer in 15 mL methylene chloride). 10 mL of 1M $BH_3$-tetrahydrofuran complex (Aldrich) is added by syringe and the mixture heated at reflux for 1 hour. Methanol is added to the gelled reaction mixture at 25 C. After gassing subsides, the polymer is collected by filtration, washed with water and then methanol, and vacuum dried. The polymer is dissolved in tetrahydrofuran (15% solids) and cast into a film on a glass plate using a Bird applicator with a 30 mil (0.030 inches, or about 0.075 cm) gap. The dried film has an IR spectrum consistent with phenyl-CH(OH)-phenyl group in which all the carbonyl or the former aryloyl groups have been converted to hydroxyls. The film is immersed in methylene chloride (100 mL) containing 10 mL of DAST (diethylaminosulfur trifluoride) in a glass baking dish enclosed in a sealed Ziploc® plastic bag. The film is removed from the reaction solution after immersion for 16 hours and dried. The hydroxy groups are completely replaced by fluorine as shown by infrared spectroscopy. The resultant film is immersed in chlorosulfonic acid (1 mL in methylene chloride, 100 mL) for 16 hours. The red-black film is removed, washed in water for 16 hours, and dried. The acid number of the film is 2.5 meq $SO_3H/g$ as determined by titration with standardized sodium hydroxide.

Example 2

A membrane is made as in Example 1, except that sulfonation is with 30 hours reaction with 30% oleum. The acid number/ion exchange capacity is 2.5 Wet conductivity is 0.187 S/cm at 100° C., while one-hour water uptake at 100° C. is 35%.

What is claimed is:

1. A polyelectrolyte membrane suitable for use in a fuel cell, comprising a solid state sulfonation product of a fluorinated polymer in film form, wherein the fluorinated polymer comprises repeating units represented by the structure

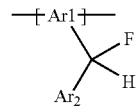

wherein Ar1 and Ar2 are independently selected from the group consisting of aryl ring, aryl ring system, and thiophene, and are optionally substituted with $C_1$ to $C_4$ alkyl groups.

2. A membrane, according to claim 1, wherein Ar1 and Ar2 comprise phenyl rings.

3. A membrane according to claim 1, wherein Ar1 comprises a thiophene ring.

4. A membrane according to claim 1, wherein Ar1 comprises a thiophene ring and Ar2 comprises a phenyl ring.

5. A membrane according to claim 1, made by a process comprising reacting a film of the fluorinated polymer with a sulfonating agent.

6. A membrane according to claim 5, wherein the sulfonating agent comprises chlorosulfonic acid.

7. A membrane according to claim 1, wherein the ion exchange capacity of the membrane is from about 0.5 to about 3.2 meq $SO_3H$/g.

8. A fuel cell comprising a polyelectrolyte membrane according to claim 1.

9. A method for making a polyelectrolyte film comprising reacting an arylene polymer with a reducing agent to produce a reduced polymer comprising repeating units of structure;

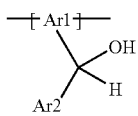

solution casting a film from the reduced polymer;

reacting the cast film with a fluorinating agent to produce a fluorinated film; and contacting the fluorinated film with a sulfonating agent to prepare the polyelectrolyte film, wherein Ar1 and Ar2 are independently selected from the group consisting of aryl ring, aryl ring system, and thiophene ring, and are optionally substituted with $C_1$ to $C_4$ alkyl groups.

10. A method according to claim 9, wherein the sulfonating agent comprises chlorosulfonic acid.

11. A method according to claim 9, wherein the fluorinating agent comprises DAST.

12. A method according to claim 9, wherein Ar1 and Ar2 comprise phenyl rings.

13. A method according to claim 9, wherein the reducing agent comprises $BH_3$, the fluorinating agent comprises DAST, and the sulfonating agent comprises chlorosulfonic acid.

14. A method according to claim 9, wherein the arylene polymer comprises repeating units of

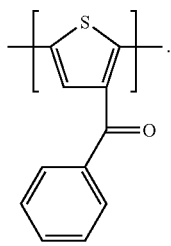

15. A method according to claim 9, wherein the arylene polymer comprises repeating units of

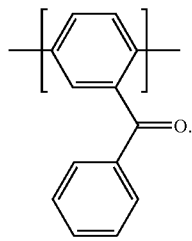

16. A fuel cell comprising
an anode,
a cathode,
a polyelectrolyte membrane disposed between the anode and cathode,
an inlet for hydrogen fuel adjacent the anode, and
an inlet for oxygen adjacent the cathode,
wherein the polyelectrolyte membrane comprises a sulfonated polymer comprising repeating units of

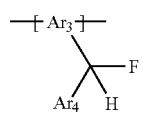

wherein Ar3 and Ar4 are independently selected from the group consisting of aryl ring, aryl ring system, and thiophene ring, wherein at least one of Ar3 and Ar4 is substituted with $SO_3H$.

17. A fuel cell according to claim 16, wherein the polyelectrolyte membrane has a conductivity S of 0.2 S/cm or greater at 100° C.

18. A fuel cell according to claim 16, wherein Ar3 and Ar4 comprise phenyl rings.

19. A fuel cell according to claim 16, wherein Ar3 comprises a thiophene ring.

20. A fuel cell according to claim 16, wherein the ion exchange capacity is from 0.5 to 5.0 meq/g.

21. A film suitable for use as a polyelectrolyte membrane comprising a sulfonated polymer, wherein the sulfonated polymer comprises repeating units of structure

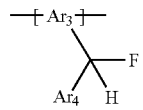

wherein Ar3 and Ar4 are independently selected from the group consisting of aryl ring, aryl ring system, and thiophene ring, wherein at least one of Ar3 and Ar4 is substituted with $SO_3H$.

22. A film according to claim 21, wherein Ar3 and Ar4 comprise phenyl rings.

23. A film according to claim 21, wherein Ar3 comprises a thiophene ring.

* * * * *